US008729834B1

(12) United States Patent
Funderburk et al.

(10) Patent No.: US 8,729,834 B1
(45) Date of Patent: May 20, 2014

(54) SYSTEM AND METHOD FOR CONTROL OF LIGHTING SYSTEMS

(75) Inventors: John Funderburk, Plymouth, MA (US); Stephen Anthony Hall, East Sandwich, MA (US); James J. Killion, Sandwich, MA (US)

(73) Assignee: Plimoth Bay Controls, LLC, Plymouth, MA (US)

( * ) Notice: Subject to any disclaimer, the term of this patent is extended or adjusted under 35 U.S.C. 154(b) by 649 days.

(21) Appl. No.: 13/053,696

(22) Filed: Mar. 22, 2011

(51) Int. Cl.
*H05B 37/00* (2006.01)
*H05B 39/00* (2006.01)

(52) U.S. Cl.
USPC .......................................... 315/312; 340/9.11

(58) Field of Classification Search
USPC .......... 315/149, 159, 160, 175, 312, 318, 319; 340/9.11, 10.6, 12.52, 825.62, 825.73
See application file for complete search history.

(56) References Cited

U.S. PATENT DOCUMENTS 8,207,821 B2 * 6/2012 Roberge et al. ............... 340/9.11
2003/0127998 A1 * 7/2003 Notarianni et al. ........... 315/312

* cited by examiner

*Primary Examiner* — Jimmy Vu
(74) *Attorney, Agent, or Firm* — Chapin IP Law, LLC

(57) ABSTRACT

Techniques disclosed herein include systems and methods for automated control of lighting systems. Such lighting system controllers can provide a range of control without requiring substantial programming, and that are compatible with existing, conventional, and new lighting systems. Such controllers include devices that can provide several features including network connectivity, a range of output levels, automated demand response control to manage electricity consumption, automated response to secondary sensor input (such as from photoreceptors and motion detectors), and generation of statistics showing power savings. A lighting controller polls a remote server or associated sensors to gather data relating to light output levels, determines to modify light output of corresponding light fixtures, and then transmits radio frequency signals over electrical power lines to light fixtures to modify light output.

20 Claims, 13 Drawing Sheets

Device Control Interface

500

Functions

- ▲ Groups
- Setup
- Schedule
- Admin
- Status
- Statistics

| | Group A | | Group B | | Group C | | Group D | | Description |
|---|---|---|---|---|---|---|---|---|---|
| Device | Value | Device | Value | Device | Value | Device | Value | | |
| Sensor | 7 | Sensor | 15 | Sensor | 20 | Sensor | 24 | | Sensor ID (1-254, 0 = None) |
| Node | 30 | Node | 32 | Node | 34 | Node | 36 | | Sensor ID (1-254, 0 = None) |
| Node | 7 | Node | 8 | Node | 9 | Node | 12 | | Node ID (1-64, 0 = None) |
| Node | 50 | Node | 45 | Node | 60 | Node | 64 | | Node ID (1-64, 0 = None) |
| Node | 52 | Node | 36 | Node | 37 | Node | 38 | | Node ID (1-64, 0 = None) |
| Node | 17 | Node | 14 | Node | 24 | Node | 28 | | Node ID (1-64, 0 = None) |

Submit | Reset | Refresh

Plimoth Bay Controls

*FIG. 5*

Device Control Interface

600

Functions

- Groups
- ▲ Setup
- Schedule
- Admin
- Status
- Statistics

| Name | Sensor Group A | Sensor Group B | Sensor Group C | Sensor Group D | Description |
|---|---|---|---|---|---|
| System Running State | Check Group | Check Group | Check Group | Check Group | Identifies the system operating mode and status |
| Reporting Status | | | | | |
| Sensed Illumination Level | 0 | 25 | 80 | 100 | Current light sensor level (Fc) |
| Illumination Setting | 35 | 50 | 80 | 80 | Node Set Percentage (0-100% of fixture Maximum) |
| Occupancy Detection | Not Occupied | Occupied | Occupied | Occupied | Reports the occupancy sensor status |
| Illumination Setup | | | | | |
| Illumination Set Level | 50 | 50 | 50 | 50 | Adjustment (0-100 Foot Candles) |
| Max. Controlled Illumination | 100 | 100 | 100 | 100 | Adjustment (0-100% of Max. Illumination Control) |
| Min. Controlled Illumination | 35 | 35 | 35 | 35 | Adjustment (0-100% of Max. Illumination Control) |
| Occupancy Setup | | | | | |
| Occupancy OFF Light Level | 0 | 0 | 0 | 0 | Adjustment (0-100% of Fixture Maximum, 0 is OFF |
| Occupancy Reduction Delay | 180 | 180 | 180 | 180 | Adjustment (0-600 Seconds) |
| Occupancy Lights OFF Delay | 600 | 600 | 600 | 600 | Adjustment (0-1800 Seconds) |
| Control | | | | | |
| Lights On or Off | ON ▶ | ON ▶ | ON ▶ | ON ▶ | Node Circuit ON or OFF |
| Enable Photo Sensor | ON ▶ | ON ▶ | OFF ▶ | ON ▶ | Select ON or OFF |
| Enable Occupancy Sensor | ON ▶ | OFF ▶ | ON ▶ | ON ▶ | Select ON or OFF |
| Remote Control | | | | | |
| Enable Synchronization | ON ▶ | | | | Select ON or OFF |

Submit | Reset | Refresh

Plimoth Bay Controls

FIG. 6

Device Control Interface

700

Functions

- Groups
- Setup
- ▲ Schedule
- Admin
- Status
- Statistics

| Function | Value | Description | Value | Description |
|---|---|---|---|---|
| Operator Overrides | | | | |
| Manual Override | OFF ▶ | Select ON or OFF | 80 | Adjustment (0-100% of Illumination Range) |
| Utility Demand Response | ON ▶ | Select ON or OFF | 20 | Adjustment (0-100% of Illumination Range) |
| Remote User Demand Response | NO ▶ | YES to Allow or NO to Disallow | | |
| Daily Schedule | | | | |
| Event #1 | 06:00 | Enter 24 hour time (hh:mm) | 50 | Adjustment (0-100% of Illumination Range, 0 = OFF) |
| Event #2 | 08:00 | Enter 24 hour time (hh:mm) | 80 | Adjustment (0-100% of Illumination Range, 0 = OFF) |
| Event #3 | 12:00 | Enter 24 hour time (hh:mm) | 60 | Adjustment (0-100% of Illumination Range, 0 = OFF) |
| Event #4 | 13:00 | Enter 24 hour time (hh:mm) | 80 | Adjustment (0-100% of Illumination Range, 0 = OFF) |
| Event #5 | 17:00 | Enter 24 hour time (hh:mm) | 40 | Adjustment (0-100% of Illumination Range, 0 = OFF) |
| Event #6 | 21:00 | Enter 24 hour time (hh:mm) | 0 | Adjustment (0-100% of Illumination Range, 0 = OFF) |
| Enable Daily Schedule | YES ▶ | Select YES or NO | | |
| Weekend Schedule | | | | |
| Enable Weekend Schedule | NO ▶ | Select YES or NO | 100 | Adjustment (0-100% of Illumination Range, 0 = OFF) |
| Holiday Schedule | | | | |
| Date #1 | 01/01/2010 | Date #4 | 05/31/2010 | Valid Entry (mm/dd/yyyy) |
| Date #2 | 01/18/2010 | Date #5 | 11/25/2010 | Valid Entry (mm/dd/yyyy) |
| Date #3 | 04/30/2010 | Date #6 | 12/25/2010 | Valid Entry (mm/dd/yyyy) |
| Operation | | | | |
| Update Scheduled Entries | NO ▶ | Select YES or NO | | |

Submit  Reset  Refresh

Plimoth Bay Controls

FIG. 7

Device Control Interface

800

Functions

- Groups
- Setup
- Schedule
- ▲ Admin
- Status
- Statistics

| Name | Value | Description |
|---|---|---|
| MAC Address | 0090c2dfa29a | Unique Network address for this device |
| Network Settings | | |
| IP Address | 192.168.1.150 | Obtain IP Address from your Network Administrator |
| Netmask | 255.255.255.0 | Obtain Netmask from your network administrator |
| Default Gateway | 192.168.1.1 | Obtain Default Gateway from your network administrator |
| Update Network Settings | NO ▶ | Yes or No to update on Submit |
| System Clock Settings | | |
| Enter Date | 01/01/2000 | Valid Entry (mm/dd/yyyy) |
| Enter Time | 00:34:08 | Valid Entry (hh:mm:ss) |
| Update Date and Time | NO ▶ | Yes or No to Update on Submit |
| System Users | | |
| Admin Password | admin | Letters and Numbers only |
| Remote User Name | user | Enter user name for remote access |
| Remote User Password | user | Letters and Numbers only |
| Update Administrator Password | NO ▶ | Yes or No to Update on Submit |
| Update Remote User Name and Password | NO ▶ | Yes or No to Update on Submit |
| Demand Response Synchronization | | |
| Synchronization IP Address | 0.0.0.0 | Synchronization IP Address |
| Update Synchronization IP Address | NO ▶ | Yes or No to Update on Submit |

[ Submit ]  [ Reset ]  [ Refresh ]

Plimoth Bay Controls

FIG. 8

Device Control Interface

900

Functions
- Groups
- Setup
- Schedule
- Admin
- Status
- ▲ Statistics

| Group A | Value | Power Consumption ||||  | Group B | Value | Power Consumption |||| Group Value Description |
|---|---|---|---|---|---|---|---|---|---|---|---|---|---|
|  |  | Volts | Amps | Pwr (kW) | Ref (kW) | Sav (kW) |  |  | Volts | Amps | Pwr (kW) | Ref (kW) | Sav (kW) |  |
| Node | 0 | 0.0 | 0.000 | 0.000 | 0.000 | 0.000 | Node | 0 | 0.0 | 0.000 | 0.000 | 0.000 | 0.000 | Node ID (1-64, 0 = None) |
| Node | 0 | 0.0 | 0.000 | 0.000 | 0.000 | 0.000 | Node | 0 | 0.0 | 0.000 | 0.000 | 0.000 | 0.000 | Node ID (1-64, 0 = None) |
| Node | 0 | 0.0 | 0.000 | 0.000 | 0.000 | 0.000 | Node | 0 | 0.0 | 0.000 | 0.000 | 0.000 | 0.000 | Node ID (1-64, 0 = None) |
| Node | 0 | 0.0 | 0.000 | 0.000 | 0.000 | 0.000 | Node | 0 | 0.0 | 0.000 | 0.000 | 0.000 | 0.000 | Node ID (1-64, 0 = None) |
| Node | 0 | 0.0 | 0.000 | 0.000 | 0.000 | 0.000 | Node | 0 | 0.0 | 0.000 | 0.000 | 0.000 | 0.000 | Node ID (1-64, 0 = None) |

| Group C | Value | Power Consumption |||| | Group D | Value | Power Consumption |||| Group Value Description |
|---|---|---|---|---|---|---|---|---|---|---|---|---|---|
|  |  | Volts | Amps | Pwr (kW) | Ref (kW) | Sav (kW) |  |  | Volts | Amps | Pwr (kW) | Ref (kW) | Sav (kW) |  |
| Node | 0 | 0.0 | 0.000 | 0.000 | 0.000 | 0.000 | Node | 0 | 0.0 | 0.000 | 0.000 | 0.000 | 0.000 | Node ID (1-64, 0 = None) |
| Node | 0 | 0.0 | 0.000 | 0.000 | 0.000 | 0.000 | Node | 0 | 0.0 | 0.000 | 0.000 | 0.000 | 0.000 | Node ID (1-64, 0 = None) |
| Node | 0 | 0.0 | 0.000 | 0.000 | 0.000 | 0.000 | Node | 0 | 0.0 | 0.000 | 0.000 | 0.000 | 0.000 | Node ID (1-64, 0 = None) |
| Node | 0 | 0.0 | 0.000 | 0.000 | 0.000 | 0.000 | Node | 0 | 0.0 | 0.000 | 0.000 | 0.000 | 0.000 | Node ID (1-64, 0 = None) |
| Node | 0 | 0.0 | 0.000 | 0.000 | 0.000 | 0.000 | Node | 0 | 0.0 | 0.000 | 0.000 | 0.000 | 0.000 | Node ID (1-64, 0 = None) |
| Total Group A | | | | 0.000 | 0.000 | 0.000 | Total Group B | | | | 0.000 | 0.000 | 0.000 | |
| Total Group C | | | | 0.000 | 0.000 | 0.000 | Total Group D | | | | 0.000 | 0.000 | 0.000 | |

Set Reference    Clear Reference

Group A Estimated kWh saved: 0.000
Group B Estimated kWh saved: 0.000
Group C Estimated kWh saved: 0.000
Group D Estimated kWh saved: 0.000

Plimoth Bay Controls

*FIG. 9*

SYSTEM AND METHOD FOR CONTROL OF LIGHTING SYSTEMS

BACKGROUND

The present disclosure relates to lighting systems and, more specifically, lighting system controllers. Lighting systems can include light fixtures, light bulbs, ballasts, electrical wiring, etc. Lighting systems are commonplace in buildings, schools, homes, outdoor spaces, arenas, and so forth. Lighting systems can be simple or complex, and can include multiple different types of fixtures and lamps/bulbs, different layouts, and amount of fixtures included in a given system.

SUMMARY

Control of lighting systems is important for several reasons including lighting efficiency, demand response requests, and convenience. With respect to lighting efficiency, energy consumed by the operation of lighting systems can represent a significant expenditure. New light fixtures and light bulbs or lighting element technologies provide lighting systems that are more efficient than conventional, existing, or installed lighting systems. Replacing less efficient lighting systems can result in improved efficiency, but one issue, however, is the cost associated with purchase and installation of such efficient lighting systems. For example, the return on an investment in energy savings for purchasing and installing efficient lighting systems may not be realized for many, many years. Such a long period to recoup a lighting upgrade can deter a decision to upgrade to efficient lighting systems. By controlling lighting systems according to techniques disclosed herein, however, energy savings can pay for new lighting fixtures within a couple of years or less. Techniques disclosed herein can also significantly lower electricity expenditure for existing systems.

For example, many buildings use fluorescent lighting fixtures. Fluorescence lights are typically not dimmable unless such fluorescent lighting fixtures have a dimmable or controllable ballast. There exist controllable ballasts that provide dimming capability. Some controllable ballasts can be controlled by a power line carrier system while others use analog or digital signals. A ballast controlled by a power line carrier system looks like a conventional ballast in that there are no special control wires or interfaces to the controllable ballast. Power line carrier is also known as power line communication, and is a technique for carrying/transmitting data or signals on a conductor that is also used for transmitting electrical power. Such controllable ballasts can be controlled by a lighting circuit control module/node that is attached in-line with an electrical circuit of the controllable ballast. The lighting circuit control module attached to, or in-line with, the electrical circuit can then push or transmit low-frequency signals to the controllable ballasts over the same electrical lines supplying power to the controllable ballasts and corresponding lighting fixtures. For example, the lighting circuit control module can be installed in or nearby a circuit breaker or circuit panel box. The controllable ballasts are then controlled by low-frequency signals transmitted across the electrical power line. Signals transmitted over the power line can control an output level of the controllable ballast. The lighting circuit control module then operates as a step dimmer by receiving manual input designating a specific light level increment (e.g. 60% or 80% of maximum output), and then transmitting a signal to the ballasts to reduce/increase light output accordingly. Thus, such controllable ballasts provide a step toward lighting efficiency, yet require manual input or additional devices such as complicated programmable logic controllers.

Analog ballasts have provisions for 0-10 v signal inputs, which allow for an output range of operation. A circuit control module converts modbus protocol transmitted by the lighting control device into analog or 0-10 v signals which controls the ballasts.

Digital ballasts have provisions to receive Digital Addressable Lighting Interface (DALI) which is a distinct protocol set and allows for an output range of operation. A circuit control module converts modbus protocol transmitted by the lighting control device into DALI which controls the ballasts.

Controllable lighting systems can help during demand response conditions. Demand response is a mechanism that electricity suppliers use to manage consumption of electricity within an electrical grid. Demand response is typically executed as a manual request (phone call or email) by electricity suppliers to electricity consumers to reduce electricity consumption for a given period. Such a request to reduce electricity consumption is usually a result of critical usage and/or market prices. For example, during a hot summer day, an electricity supplier might ask customers to reduce power consumption by 20% or some other amount. Such a request to reduce consumption could be due to the electric grid being over taxed, and/or having to use less efficient generators to meet the demand. Demand response is also known as price response programs.

Techniques disclosed herein include systems and methods for automated control of lighting systems. Such lighting system controllers can provide a range of control without requiring complicated programming, and that are compatible with existing, conventional, and new lighting systems. Such controllers include devices that can provide several features including network connectivity, a range of output levels (instead of step dimming), automated demand response control, automated response to secondary sensor input (such as from photo receptors and occupancy detectors), and generation of statistics on power savings.

One embodiment is a lighting control device that includes an interface that connects to a power line carrier system. The controller commands the powerline carrier by transmitting signals over the power line to control one or more light fixtures. For example, the interface converts modbus protocol to analog signals that connect to low voltage cabling for transmitting signals to control one or more light fixtures. In another example, the interface converts modus protocol to Digital Addressable Lighting Interface (DALI) that connects to low voltage cabling for transmitting signals to control one or more light fixtures. The lighting control device also includes a network interface for sending and receiving data over a communication network. The lighting control device, or a lighting controller being executed within the device, can execute several process steps. The lighting controller periodically polls a remote server to obtain demand response information. This remote server is polled over a communication network such as the Internet. Alternatively, the lighting controller can poll a peer lighting control device, functioning as a server. The lighting controller receives the demand response information from the remote server and determines, based on the demand response information, to modify light output of one or more light fixtures. Then the lighting controller transmits a signal via the power line or other means. The signal includes instructions that cause one or more light fixtures to modify light output.

In another embodiment, the lighting controller can poll a sensor to obtain light detection data. This light detection data can be collected by the sensor from visible light conditions of a physical space corresponding to one or more light fixtures. For example, the sensor can be mounted within a given room with controllable light fixtures. The lighting controller can determine, based on the light detection data, to modify light output of the one or more light fixtures, and then transmit a signal via the power line or other means based on the light detection data to modify light output Likewise, the lighting controller can receive motion detection data in response to polling the sensor. The lighting controller can then modify light output based on occupancy data in addition to, or in place of, the light detection data.

In other embodiments, the lighting controller can identify a schedule for light fixture usage, and modify light output according to the schedule. The lighting controller can also respond to requests from peer devices and devices that control other systems, such as a controller for a Heating Ventilation and Air Conditioning system (HVAC). Lighting control devices can be connected in series, that is, as a daisy chain connection for easier installation and set up.

Yet other embodiments herein include software programs to perform the steps and operations summarized above and disclosed in detail below. One such embodiment comprises a computer program product that has a computer-storage medium (e.g., a non-transitory, tangible, computer-readable media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more non-transitory computer storage media having instructions stored thereon for supporting operations such as: periodically polling another controller or sensor to obtain light control and illumination data/information collected by the sensor from visible light conditions of a physical space corresponding to the one or more light fixtures, and to obtain motion detection data collected by the sensor from the physical space corresponding to the one or more light fixtures; receiving the light detection data from the sensor and receiving the motion detection data from the sensor; determining, based on the light detection data and the motion detection data, to modify light output of the one or more light fixtures; and transmitting a signal via the power line based on the light detection data and the motion detection data, the signal including instructions that cause the one or more light fixtures to modify light output. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Plimoth Bay Controls, Plymouth, Mass., USA.

As discussed above, techniques herein are well suited for use in software applications supporting lighting control applications. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

FIG. 5 is a user interface for configuring a lighting system controller according to embodiments herein.

FIG. 6 is a user interface for configuring a lighting system controller according to embodiments herein.

FIG. 7 is a user interface for configuring a lighting system controller according to embodiments herein.

FIG. 8 is a user interface for configuring a lighting system controller according to embodiments herein.

FIG. 9 is a user interface displaying statistics associated with a lighting system controller according to embodiments herein.

DETAILED DESCRIPTION

Techniques disclosed herein include systems, devices, and methods for controlling lighting systems. Such lighting system controllers can provide a range of control without requiring substantial programming, and that is compatible with existing, conventional, and new lighting systems. Such controllers include devices that can provide several features including network connectivity, a range of outputs (instead of step dimming), automated demand response control, automated response to secondary sensor input (such as from photo receptors and occupancy detectors), and generation of statistics on power savings.

Embodiments include a lighting system controller that can function as a web controller or server that provides energy saving opportunities by using conventional lighting control modules, such as modules/nodes manufactured by Universal Lighting Technologies, and others. For example, embodiments can include modules that convert modbus protocol into analog or DALI protocol in order to allow for use with a variety of manufacturers of controllable ballasts. The lighting system controller provides a self-contained controller without needing additional operating software. Users can create a customized building light automation system using easy-to-use multi-function schedules. The lighting system controller can be configured for automatic participation with utility demand response programs. The lighting system controller can be networked to allow for multiple demand response sites to be managed from one location. The lighting system controller enables light dimming based on occupancy and/or natural lighting conditions for efficient lighting energy management. The lighting system controller provides easy configuration and operation via any web-enabled device, and can connect using conventional Ethernet cabling and connectors, or provide a wireless connection. This lighting system controller can be used in office buildings, warehouse facilities, schools, health care establishments, retail spaces, special purpose buildings, outdoor spaces, and so forth. The lighting system controller is configurable and programmable to suit individual specific needs and satisfy various specifications.

Embodiments can also include a combination occupancy-daylight sensor. The combination sensor can be a digital sensor for use with the lighting system controller. The combination sensor can be embodied as a low-voltage system that can be connected to other combination sensors using a daisy-chain connection, that is, each combination sensor can be connected in series with a next combination sensor. The combination sensor can function as a dual daylight/occupancy sensor, or as a daylight sensor only. Short or long-range occupancy sensors can be used.

Figure 1:
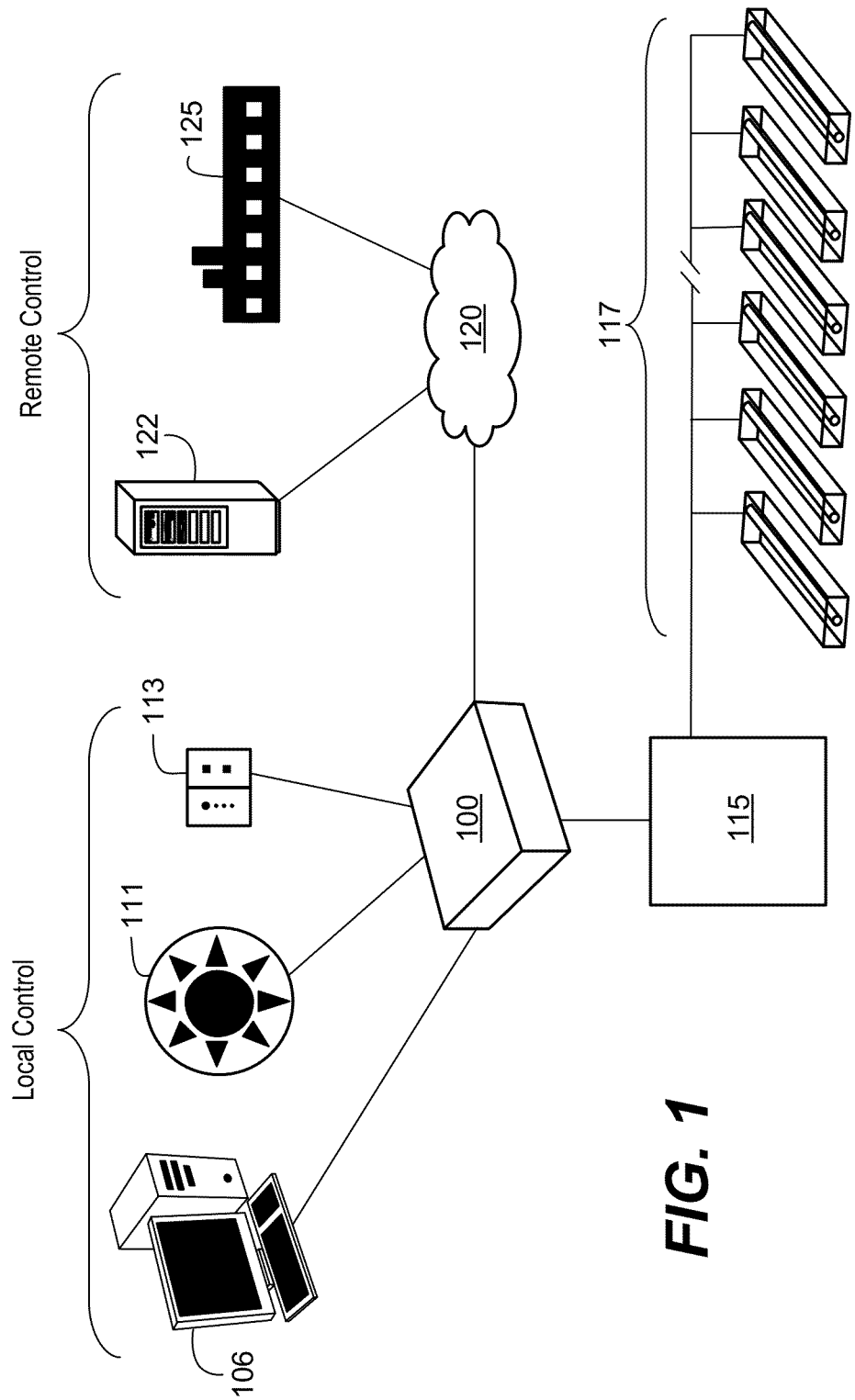
FIG. 1 is a block diagram illustrating a high-level operation of a lighting system controller according to embodiments herein.

FIG. 1 illustrates a lighting system controller 100 operating within a typical environment. In general, lighting system controller 100 is connected to an electrical power line that includes light fixtures 117 for a particular space, room, group of rooms, building, etc. A circuit control node 115 can also be attached to the power line and is used to receive instructions from lighting system controller 100 and, in response, transmit discrete control signals to light figures 117. Lighting system controller 100 can be controlled locally and remotely. Local control includes a client device 106, a photoreceptor 111, and a manual switch 113. The client device 106 can be used to configure the lighting system controller 100 including scheduling light output levels for various time periods. The photoreceptor 111 can be part of a sensor the identifies lighting conditions, which can include natural light, secondary light, and perceived light due to room features. Remote control can be accessed via network 120. Lighting system controller 100 can then connect to remote server 122 and/or utility supplier 125.

Embodiments disclosed herein, operating in such an environment, enable increased lighting efficiency and dynamic response. In general, lighting requirements of a given space are not static. Indeed, lighting requirements can change due to several different factors. For example, such factors include time of day, expected occupancy duration, cloud cover, and so forth. Moreover, in certain spaces and at certain times of day, such spaces may receive a significant amount of natural light. For example, as the sun rises, spaces having windows or openings on an easterly side of a corresponding building may receive significant amounts of sunlight. Then as the day progresses and the sun rises further in the sky, the amount of natural light in the spaces on the easterly side of the building may diminish, may stay the same, or may increase. As the day continues into the afternoon and evening, spaces in the building on the westerly side of the building may begin to receive more natural light, while spaces on the easterly side of the building may receive less natural light. Because given spaces can have ample amounts of natural light from time to time, light fixtures can be dimmed significantly or even shut off during those periods of sufficient natural light. By way of a non-limiting example, during bright sunny days light fixtures may only need to run at 50% brightness to provide sufficient lighting for their intended purposes. By adjusting or modifying light output of light fixtures based on actual lighting conditions of a given space, the lighting system controller 100 can maximize efficiency of lighting in a given space.

Note that there are additional factors that can affect lighting or perceived lighting of a given space. Such factors can include floor color and wall color. When lighting is designed for a given space, such design is typically based on a square foot analysis, without considering floor color, wall color, expected natural light, and other factors. And room configurations and colors can change. While some spaces might have a darker color scheme, other spaces might be predominantly white and reflect more light. It is common then for some spaces to have more light than is actually needed for use of such spaces. For example, many users of office spaces report lighting conditions to be too bright, and it is common for lighting output that is 80% of a respective maximum output to be preferred or sufficient for some office lighting needs.

Figure 2:
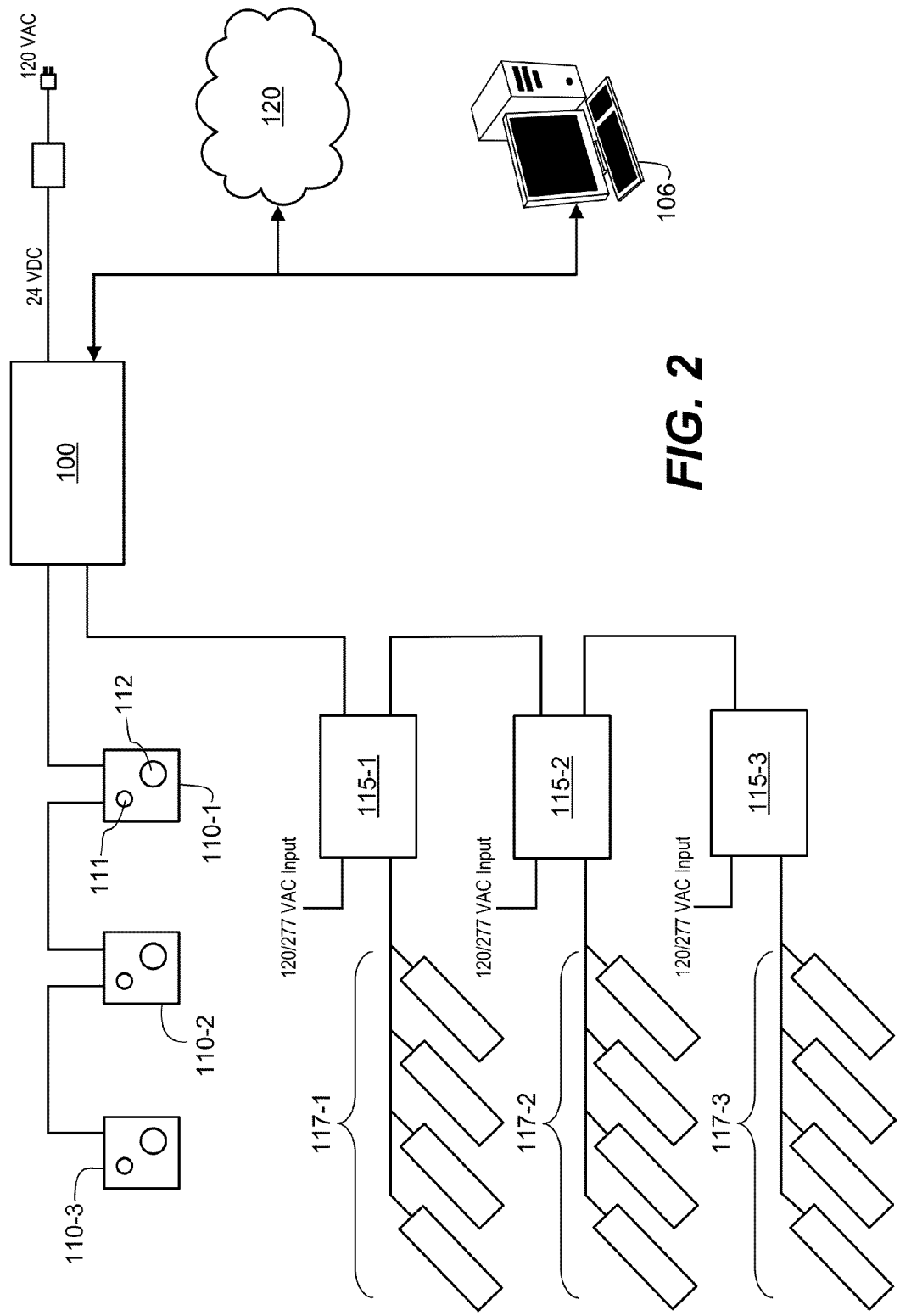
FIG. 2 is a wiring diagram of a lighting system controller according to embodiments herein.

Referring now to FIG. 2, FIG. 2 illustrates an exemplary wiring diagram, which is useful to explain use of example embodiments of lighting system controller 100. In this wiring diagram, there are three lighting fixture groups 117-1, 117-2, and 117-3, which can each be on a separate electrical power circuit. Each lighting fixture can be designed for various types of replaceable lighting elements/lamps. Such lamps can include incandescent light bulbs, arc lamps, gas discharge lamps, light-emitting diode (LED) lamps, and fluorescent lamps/bulbs. For convenience in describing embodiments, this detailed description will primary refer to fluorescent bulbs, though embodiments can be applied to any conventional lamps and lighting fixtures. Conventional fluorescent lamps usually require an electronic ballast to regulate current, and so fluorescent lighting fixtures herein are assumed to have an accompanying ballast. The number of fixtures on a given circuit and vary based on wattage. For example there could be seven fixtures or 70 fixtures or more.

Each power circuit of lighting fixtures 117-1, 117-2, and 117-3 can have a respective circuit control node 115-1, 115-2, and 115-3, each with a respective power source. The circuit control nodes can operate as conversion devices that receive a signal from lighting system controller 100, such as dimming instructions, and then convert that signal into something that the ballasts or fixtures will understand to execute a step dim operation or dimming to a specific level. The nodes are then attached to, or installed in-line with, the power circuit. These nodes can then send a low-frequency Radio Frequency (RF) signal to ballasts on a respective electrical circuit, or otherwise communicate to lighting fixtures.

The lighting system controller 100 can be connected to one or more sensors 110-1, 110-2, and 110-3. Each sensor 110 can include a photoreceptor 111 to detect lighting conditions, and a motion detector 112. In this example illustration there are three sensors, but lighting system controller 100 can be connected with any number of sensors. The sensors can optionally include additional sensors such as a decibel meter, thermometer, etc. The sensors 110 can be daisy chained off of each other. Such a serial connection is a significant advantage for installation, especially for installation in existing structures because a homerun connection is not required from each sensor. This means no complicated wiring panels are needed. While any number of sensors can be used for a given building/space, practical considerations can control actual installation. For example, for small offices it may not be cost effective to install a sensor in every single room. For buildings with larger rooms, however, such as classrooms in schools, meeting rooms in office buildings, and other larger spaces, it can become cost-effective to install a sensor in each of these rooms. If a given sensor 110 detects no occupancy, then the lighting system controller 100 can send a signal to dim or power-off lights in the vacant room. In other words, if there are only one or two fixtures within a given space, then it may not be cost effective to install a sensor in each space. If a given area or building has multiple smaller spaces, embodiments can be implemented as zonal dimming. For example, sensors can be installed based on elevation and light exposure, and then the lighting system controller 100 can adjust lighting based on zonal sensing. With zonal dimming, the energy savings may not be as significant as individual room sensing, but can nevertheless still result in significant energy savings.

Figure 3:
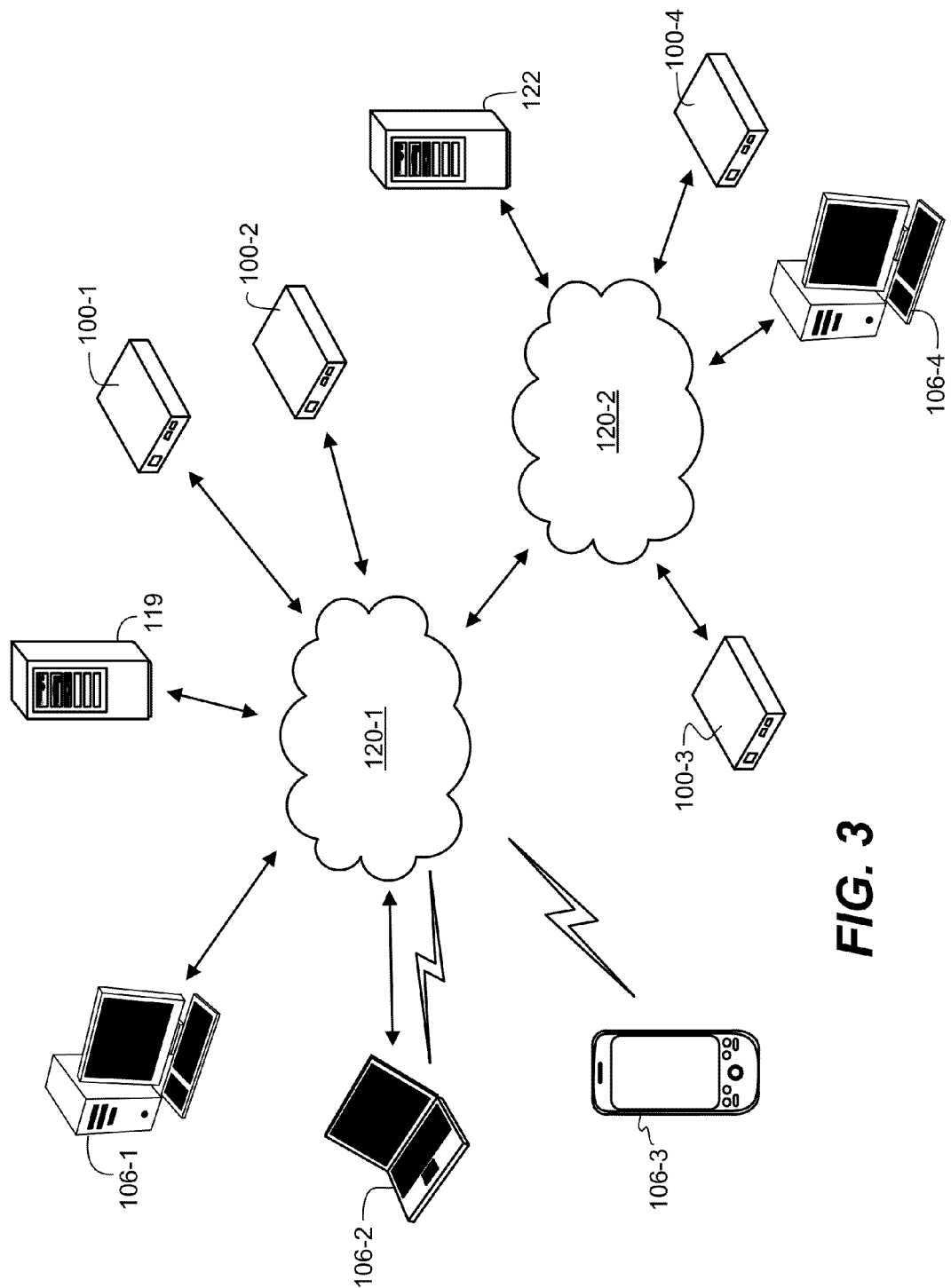
FIG. 3 is a diagram showing network architecture of a lighting system controller according to embodiments herein.

Referring now to FIG. 3, lighting system controller 100 is shown within a networking architecture. Lighting system controller 100 includes devices 100-1, 100-2, 100-3, and 100-4. The communication network can include a local area network 120-1, and a wide area network 120-2. Client devices 106-1, 106-2, 106-3, and 106-4 can include various computers, laptops, and mobile devices using various operation systems. Each of client devices can connect to any of the lighting system controllers 100 to configure the controllers 100. Each lighting system controller 100 can function as a web server that communications with a local server 119, remote server 122, or peer lighting system controller 100. Peer lighting system controllers can function as a local or remote server to peer lighting system controllers 100, and can connect to each other either over the communication network.

Embodied as a web server, the lighting system controller 100 can access or request information from another server or device to get instructions. The lighting system controller 100 can then be embodied as a plug-and-play device. The device can then be pointed to one or more servers, during an initial configuration. Subsequently, the lighting system controller 100 routinely requests information to determine whether there is a demand response request in effect. By way of a non-limiting example, the lighting system controller 100 can use Extensible Markup Language (XML) to ask for a specific XML file, which can be maintained and updated at a remote server 122. Users of lighting system controller 100 do not need to pre-register with a power supplier or utility company, but can simply point to a web resource to access or request. The remote server 122 can then return information such as a simple On or Off, or Yes or No, or more detailed instructions, so that the lighting system controller 100 knows whether to initiate a demand response mode.

Thus, the lighting system controller 100 can communicate with an external entity to receive instructions about how to control lighting. The lighting system controller 100 can include a demand response mode. Operating with the demand response mode active, when the lighting system controller 100 discovers that its location is within an area that is part of a demand response request, then the lighting system controller 100 can initiate the demand response mode and modifying lighting output levels accordingly. By way of a specific example, a given space happens to be operating at 80% of output because of a corresponding bright sunny day. That is, lighting system controller 100 acquired actual lighting levels from corresponding sensors 110, and modified light output to 80% because that is all of the output needed in combination with natural light to adequately illuminate a space. Then the lighting system controller 100 then polls a remote server, as part of a routine polling operation, and requests demand response status. Lighting system controller 100 learns that there is a current demand response condition in effect for the particular building in which the lighting system controller 100 operates. The demand response request may ask consumers to lower energy output by 20% or to take the lighting down to 60%. In response, the lighting system controller 100 could then modify lighting output to 50% or 60%. Alternatively, the lighting system controller 100 can be configured to poll a local server or peer device to acquire demand response information.

By functioning using a polling operation, there is no central control needed for lighting system controllers. In one implementation, a given organization might have buildings located across a large geographic region and this organization buys energy from a single supplier. The single supplier might contact the organization on a given day, forecasted to be very hot, and ask the organization if they would reduce consumption by a megawatt of power or some other amount. The organization could then make a change on a single XML file, such as at a central server. Each building of that organization has lighting system controllers 100 installed and configured to periodically poll the central server for demand response information. Subsequent to updating this XML file, each lighting system controller will, by virtue of routine polling, discover the demand response condition, and, in response, change to a demand response mode to modify lighting output accordingly.

A given lighting system controller 100 can maintain a copy of the demand response file retrieved from the remote server, and make this file available for requests from peer devices. For example, a given building might have several lighting system controllers, but only one is configured to poll a remote server. The other peer devices can communicate in a daisy chain fashion to each other including the device that polls the remote server. Those peer devices can then be configured to poll the device that polls the remote server, to thereby acquire a copy of the demand response file from the local lighting system controller 100. This lighting system controller 100 can be considered a leader device since each device is its own server already. Peer devices can then be configured to point to the leader to determine a demand response status. Thus, follower devices can look to the leader on the chain to determine a demand response mode instead of each device polling a remote server. Additionally, daisy chaining each device prevents any given lighting control device from being overwhelmed or inundated with lighting control requests. Each device requests an XML file from either a peer device in a daisy chain or an external entity.

The lighting system controller 100 provides for synchronization (device polling as described above) among controller devices. The synchronization IP address can be the address of an external entity or another box. For example, in one synchronization configuration, lighting system controller 100-1 functions as a master or leader device. Lighting system controller 100-4 can be set to the IP address of controller 100-3 for synchronization. Controller 100-3 in turn polls controller 100-2, and controller 100-2 polls 100-1 for synchronization data. In another configuration, all of controllers 100-1, 100-2, 100-3, and 100-4 each poll local server 119 for synchronization data and/or network server 112.

Figure 4:
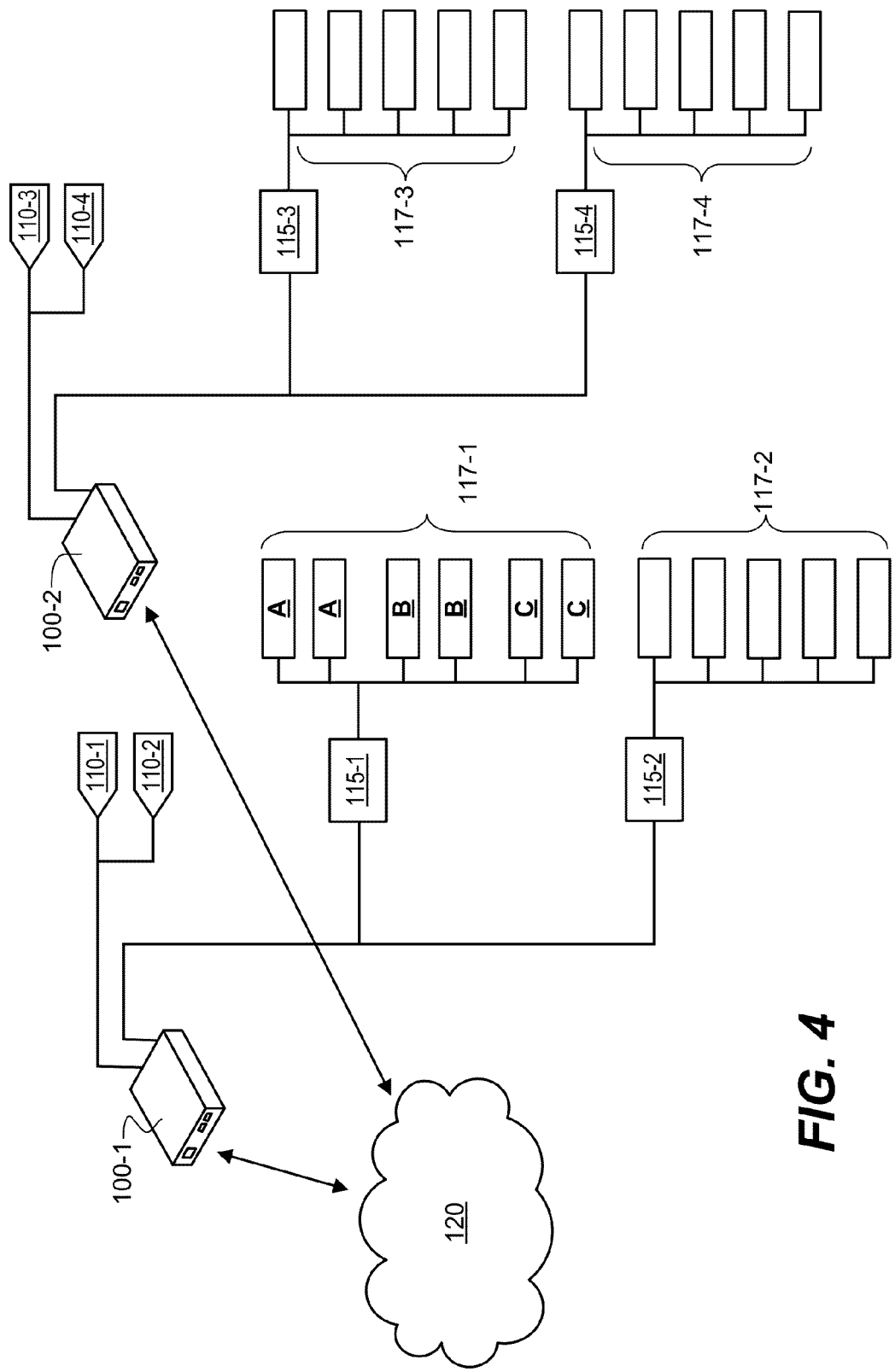
FIG. 4 is block diagram showing system configuration of a lighting system controller according to embodiments herein.

Referring now to FIG. 4, a block diagram shows another exemplary system configuration. Lighting system controllers 100-1 and 100-2 can be installed in separate buildings or within the same building. A given building can have multiple lighting system controllers 100. Each lighting system controller can connect to network 120 and/or each other. Each controller has one or more sensors 110, one or more circuit control nodes 115, and corresponding set of light fixtures 117. Devices 100 can be driven by local configuration and operation, such as a schedule-based operation. The device can alternatively, or in addition to, contact external sources to receive lighting instructions, thereby providing a self-contained, built-in, automated lighting device that already includes all firmware and/or software. One advantage of embodiments is lack of associated software required for configuration. Conventional energy management solutions and systems have associated software, such as for controlling HVAC systems. This associated software can be problematic for many users. Certain embodiments disclosed herein, however, can function as a plug-and-play device that can be set-up initially with a web browser by accessing a local IP address of the device. The lighting system controller 100 can then be fully configured and can run without maintenance. Devices can optionally be preconfigured (such as an address to periodically poll, and default light and occupancy settings) so that the device functions after being attached to a power line and network.

The lighting system controller 100 not only polls peer devices and remote servers, the lighting system controller 100 acquires locally detected data via a polling operation. Sensors 110 can be embodied as a combination occupancy and daylight sensor, as well as optionally including additional detectors. Sensors 110 can be connected to each other and to lighting system controller 100 via a daisy chain connection. To identify lighting and occupancy conditions, the lighting system controller 100 polls the sensors 110. That is, the lighting system controller 100 requests data from the sensors. Such a technique can be implemented using, for example, Modbus protocols. Modbus is a conventional serial communications protocol that is freely available and used in many industries.

Lighting system controller 100 periodically or routinely polls each associated sensor device to find out what information has been collected by sensors 110. For example, sensors can be polled every second or once per minute. When used with occupancy sensors, lighting system controller 100 can poll frequently. If lighting system controller 100 receives motion detection data from a given sensor indicating no movement for a given period of time, the lighting system controller 100 can identify a corresponding node 115 to shut off or dim corresponding light fixtures. In a more specific example, the lighting system controller 100 can be configured so that three minutes after no movement has been detected, lighting can be powered-off or reduced to a minimum level without shutting off lights entirely. Lowering lighting to a minimum level can be valuable for large rooms such as gymnasiums where lights are left on from morning to evening even though the room is not always occupied. For example there may be several periods of 10 or 15 minutes between various uses of the gymnasium. Energy savings can be captured from these periods of vacancy by quickly lowering the lighting level to a minimum when no motion is detected within the room, yet without leaving the room with no lighting during times of expected use. Another application for occupancy sensors is in parking garages. Typically, it is not desirable to leave a parking garage completely dark when not in use, but the lighting system controller 100 can dim the garage to a minimum level when there's no detected occupancy, and then brighten the garage once occupancy is detected.

For collecting light data, the sensor can use an average photo level as a value for room light levels. For example, the sensor takes consecutive readings over time, such as a reading every second, and then averages these readings over the last 30 seconds or some other interval for reporting to the lighting system controller 100. When the sensor receives a request for a light reading, the sensor can then take an average of the last 30 or 60 readings, and return that average as the room light value. Averaging light readings can prevent light output modification due to a sensor being temporarily covered.

The lighting system controller 100 can also provide scheduled lighting, and use sensor and demand response input in conjunction with the schedule. For example, a given lighting system controller 100 can be configure with six or so different events, such as power-on, power-off, and scheduled dimming. Schedules can be configured as 24-hour schedules or a 5/2-day schedules, or holiday schedules, etc.

Referring now to FIG. 4, FIG. 4 illustrates an exemplary system configuration. This system configuration includes lighting system controllers 100-1 and 100-2, each having a couple of sensors 110, circuit control nodes 115, and light fixture groups 117. Lighting system controllers 100-1 and 100-2 can each communicate via network 120 to retrieve control instructions. In some embodiments, lights on a given circuit can be controlled in three or more different ways, that is, there can be three different types of lights or three different fixture designations for controlling subgroups separately within a single circuit. In other words, each light fixture or each ballast can be separately addressable within a given circuit as one of three or more different types of fixtures. Note that light fixture group 117-1 includes three subgroups: A, B, and C.

Having separately addressable ballasts or light fixtures provides increased control of a given circuit or physical space. This is beneficial because lighting requirements can vary among different parts of an office or room. For example, areas of a relatively large space that are next to exterior windows may receive relatively greater amounts of natural light as compared to areas of the space that are located further from the windows. By way of a non-limiting example, in designing or installing light fixtures in the space, a first subgroup of light fixtures (subgroup A) can be installed closest to exterior windows of the space. Light fixtures of subgroup B can then be installed to provide lighting to a middle portion the room, which may receive less natural light than areas by exterior windows. Light fixture of subgroup C can then be installed along interior walls that receive less natural light. With such separately addressable light fixtures, the lighting controller can separately control each type or addressable group of light fixtures. In operation, such as during a sunny day, subgroup A (light fixtures windows) can perhaps be dimmed to 40 or 50%, while subgroup B light fixtures might be dimmed to 60%, and then subgroup C light fixtures (along interior walls) might be dimmed to 80%. Such controlled dimming of subgroups on a single circuit can maximize energy efficiently while providing approximately equal or appropriate lighting to all areas of the space. Such a technique provides a more accurate control of lighting without additional wiring involved. Some controllable ballasts or fixtures can be semi-addressable (by type or group), while other ballasts or fixtures can be fully addressable.

Referring now to FIGS. 5-9, these figures illustrate example interfaces for configuring lighting system controller 100. Embodied as a server, lighting system controller 100 can provide configuration via a browser interface. For example, a client device 106 can access configuration pages via a local or remote network connection to the lighting system controller 100.

FIG. 5 illustrates a configuration page that identifies groups of sensors. Here a user can input a location of each sensor group as well as a digital identification. ID numbers can be unique or common. Groups with common sensor numbers will be controlled identically. A user can configure a controller by entering a sensor ID and/or node ID (such as a Modbus ID) into a corresponding value field. Sensors and nodes can also be identified descriptively such as "Level 1," or "Room 2A," etc. The interface can identify connected sensors and nodes such as by highlighting in green. Disconnected devices can be highlighted in red or otherwise indicated. Sensor groups can be run without sensors and just operate based on schedules and demand response input. Scheduling can provide significant savings after business hours during cleaning operations. For example, cleaning crews do not typically require as much light, and so 70 or 60% of light can be sufficient for cleaning operations. If cleaning crews operate from, for example, 6:00 p.m. to 10 p.m., then this results in a 30 to 40% savings of energy for four hours. Occupancy sensors can also be used during such cleaning operations to shut off lights if no movement is detected.

FIG. 6 illustrates a configuration page for basic setup of lighting system controller 100. This setup page provides for basic monitoring as well as enabling adjustments for group illumination, occupancy, and remote control. There are several system running states that can be monitored, including check group, normal, manual override, demand response, remote user demand response, occupancy, no occupancy, schedule number, holiday schedule, weekend schedule, weekend schedule demand response, holiday schedule demand response, schedule number demand response, lights off, check sensor, and check node. The sensed illumination level refers to a value observed or collected by a photoreceptor. Such a sensed illumination level can be a combination of artificial and natural light. The illumination setting can indicate a percentage value of a maximum illumination from lighting fixtures. A user can also enter maximum and minimum values for light output, so that modifications are within those limits. For occupancy, a light level can be set for periods of no occupancy. This can include a time until a reduction in light output, as well as a time until complete powering-off of lights. A user can also toggle operation of the photo sensor, occupancy sensor, as well as remote synchronization.

FIG. 7 illustrates a scheduling interface. This interface provides for configuring a daily schedule, a weekend schedule, and a holiday schedule. Within a daily schedule, various illumination ranges can be set. This can coincide, for example, with given operating or business hours. Scheduled entries can be updated automatically. A user can also override a remote user demand response.

FIG. 8 illustrates an admin page for accessing various hardware and network settings, clock settings, passwords, synchronization addresses, and so forth.

FIG. 9 illustrates a statistics display page. The lighting system controller 100 can keep track of various metrics of power consumption, including by group or by node, and can also indicate estimated power saved. For example, the lighting system controller 100 can retrieve voltage and current from each node, which can be identified every minute, and then recorded to average over various periods of time.

Functionality associated with the lighting system controller will now be discussed via flowcharts and diagrams in FIG. 10 through FIG. 12. For purposes of the following discussion, the lighting controller 140 from FIG. 13 or other appropriate entity performs steps in the flowcharts.

Figure 10:
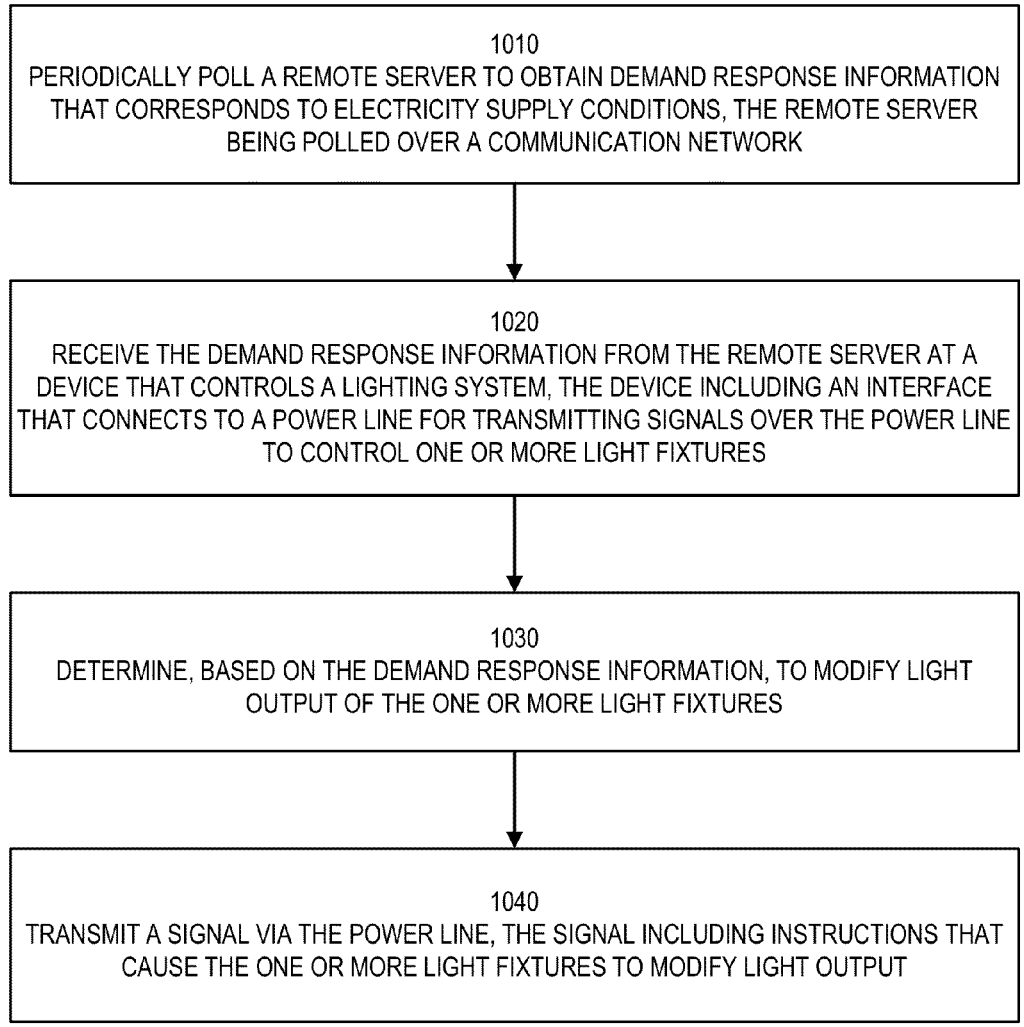
FIG. 10 is a flowchart illustrating an example of a process supporting a lighting system controller according to embodiments herein.

Now describing embodiments more specifically, FIG. 10 is a flow chart illustrating embodiments disclosed herein. In step 1010, a lighting controller periodically polls a remote server to obtain demand response information that corresponds to electricity supply conditions. Polls can be executed at a given interval, such as every second, every minute, once or twice an hour, etc. The remote server can be a web server or peer device that is not located adjacent to the controller. The remote server is polled over a communication network, thus a corresponding device of the lighting controller can include hardware for a wired or wireless network connection.

In step 1020, the lighting controller receives the demand response information from the remote server at a device that controls a lighting system. Such a device can include lighting system controller 100. The demand response information can be as simply as an "On" or "Off" demand response status, or can include detailed instructions about how much lighting systems should be reduced or modified to manage electricity consumption. This device can include an interface that connects to a power line for transmitting signals over the power line or other means to control one or more light fixtures. This can include circuitry for executing radio frequency transmissions over power lines.

In step 1030, the lighting controller determines, based on the demand response information, to modify light output of the one or more light fixtures. For example, if the demand response information has a status of "On", then the lighting controller can determine to decrease lighting intensity/output. Or, if the lighting controller is already in a demand response mode, and the demand response information indicates that the demand response period is completed, then the lighting controller can return lighting output to default or user-configured levels.

In step 1040, lighting controller transmits a signal via the power line or other means. This signal includes instructions that cause the one or more light fixtures to modify light output. For example, the lighting controller sends a signal indicating to reduce (or increase) output to 70% of maximum.

Figure 11:
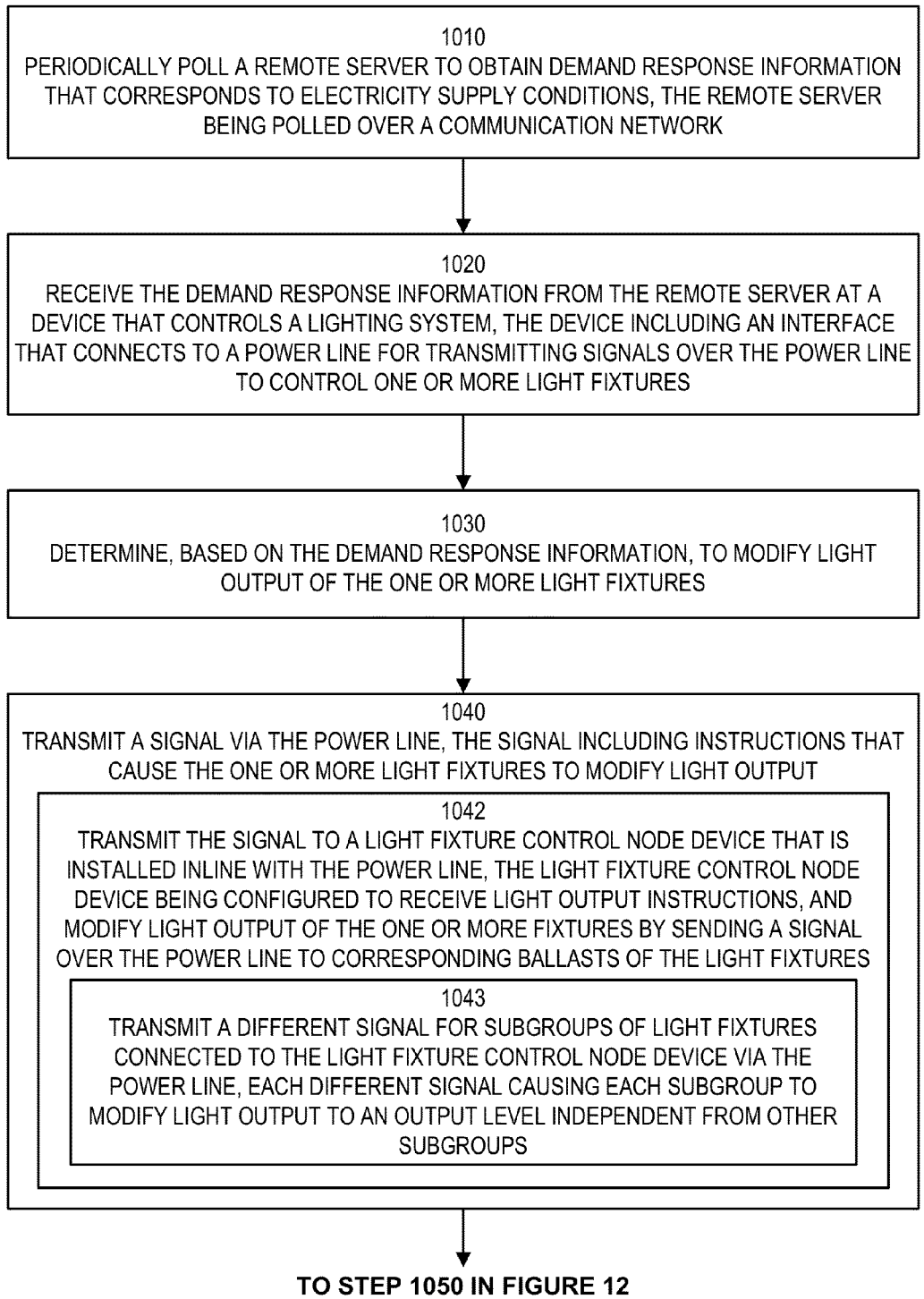
FIGS. 11-12 are a flowchart illustrating an example of a process supporting a lighting system controller according to embodiments herein.
Figure 12:
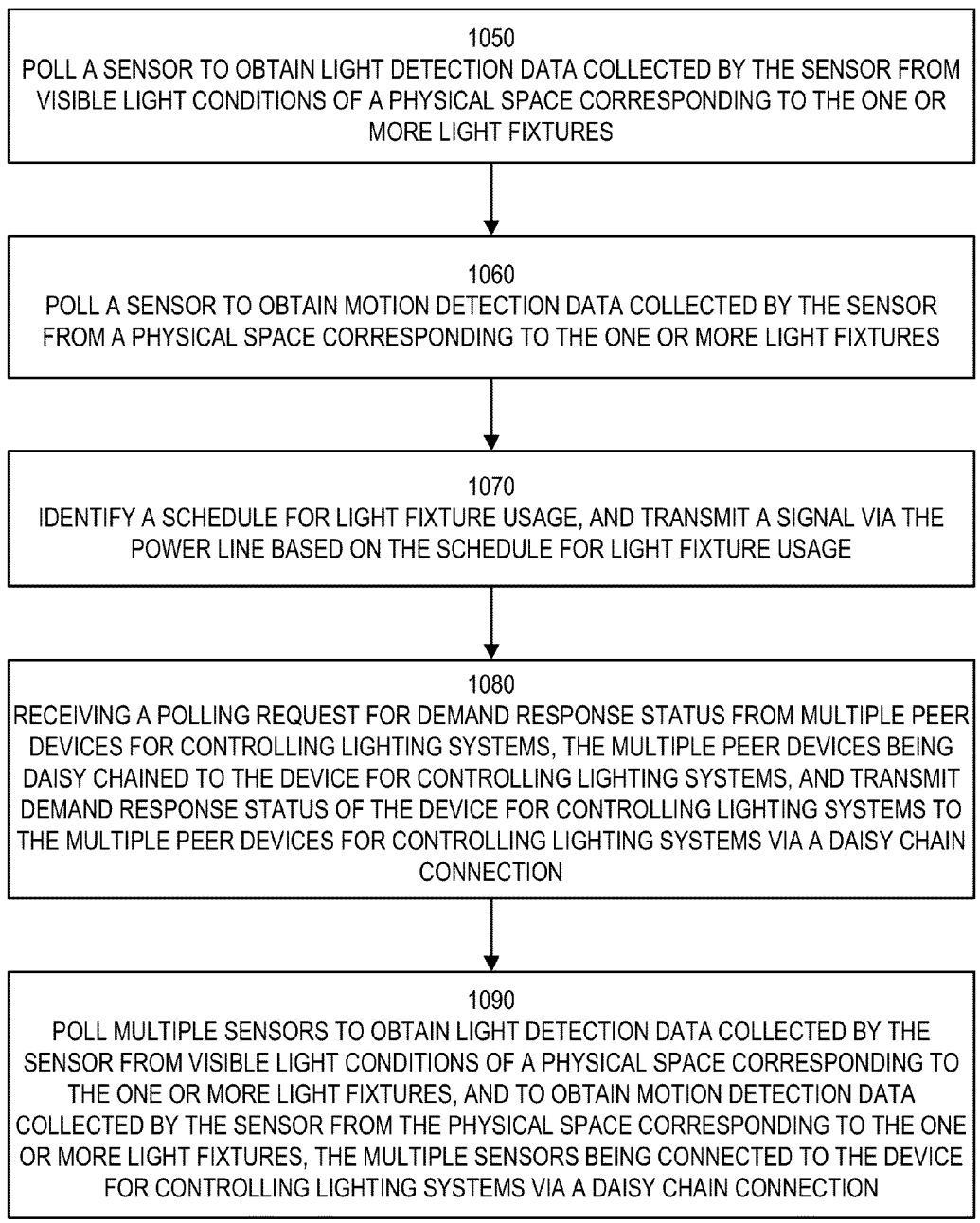

FIGS. 11-12 include a flow chart illustrating additional and/or alternative embodiments and optional functionality as disclosed herein.

In step 1010, the lighting controller periodically polls a remote server to obtain demand response information that corresponds to electricity supply conditions, with the remote server being polled over a communication network.

In step 1020, the lighting controller receives the demand response information from the remote server at a device that controls a lighting system. This device can include an interface that connects to a power line for transmitting signals over the power line or other means to control one or more light fixtures.

In step 1030, the lighting controller determines, based on the demand response information, to modify light output of the one or more light fixtures.

In step 1040, the lighting controller transmits a signal via the power line or other means, with the signal including instructions that cause the one or more light fixtures to modify light output.

In step 1042, the lighting controller transmits the signal to a light fixture control node device that is installed inline with the power line or similar control device. The light fixture control node device can be configured to receive light output instructions, and to modify light output of the one or more fixtures by sending a signal over the power line or other means to corresponding ballasts of the light fixtures. For example, the control node can be dimming device that sends control signals to all ballasts on a particular electrical circuit.

In step 1043, the lighting controller transmits a different signal for subgroups of light fixtures connected to the light fixture control node device via the power line or other means. Each different signal can cause each subgroup to modify light output to an output level independent from other subgroups. In other words, the subgroups of light fixtures can generate light output levels that are the same amount as each other, or different output levels. One example embodiment is lowering light output levels for light fixtures adjacent to exterior windows, while maintaining a higher light fixture output level for fixtures positioned away from windows or positioned in spaces without windows. Alternatively, each light fixture can be uniquely addressable and controllable. Uniquely addressable light fixtures can require relatively more initial configuration.

In step 1050, the lighting controller polls a sensor to obtain light detection data collected by the sensor from visible light conditions of a physical space corresponding to the one or more light fixtures. Visible light conditions can be a combination of natural light, artificial light, and temporary light sources. The sensor can continually or periodically read light conditions, and then respond to the lighting controller after receiving a polling request.

In step 1060, the lighting controller polls a sensor to obtain motion detection data collected by the sensor from a physical space corresponding to the one or more light fixtures. In other words, the sensor can be installed within a given room, space, or on one floor of a building to detect occupancy.

In step 1070, the lighting controller identifies a schedule for light fixture usage, and transmits a signal via the power line or other means based on the schedule for light fixture usage. Such a schedule can be user configured locally or remotely. The schedule can indicate different light output levels for various times of day.

In step 1080, the lighting controller receives a polling request for demand response status from multiple peer devices for controlling lighting systems. Multiple peer devices can communicate in a daisy chain configuration to the designated master device for controlling entire lighting systems. The master lighting controller can then transmit demand response commands to any or all of the peer devices via the digital network.

In step 1090, the lighting controller can poll multiple sensors to obtain light detection data collected by the sensor from visible light conditions of a physical space corresponding to the one or more light fixtures, and to obtain motion detection data collected by the sensor from the physical space corresponding to the one or more light fixtures. The multiple sensors can be connected to the device for controlling lighting systems via a daisy chain connection, thereby providing for easier installation and distributing processing loads.

There are several additional and alternative embodiments. The lighting controller can determine to modify light output based on data received from a photoreceptor or occupancy sensor, or from a combination of the two types of sensors. Modifying light output, via transmission of a power line signal, or other means can include decreasing or increasing output. The modified light output level can be relative to an absolute maximum output of light fixtures themselves, or to a user designated maximum output.

The lighting controller can also generate a graphical display that indicates power usage and power savings based on operation of the device and modified light output of the one or more light fixtures. For example, the lighting controller can return/generate data for display within a browser interface.

The lighting controller can also receive a polling request for demand response status from an HVAC (Heating, Ventilating, and Air Conditioning) control device, and then in response, transmit demand response status of the device for controlling lighting systems to the HVAC control device. Such a technique could result in raising or lowering building temperature by a certain number of degrees. Thus, light and occupancy sensors can also be used to control heat as well as light output.

Sensors can also receive manual input. The lighting controller can poll a sensor to obtain light output modification data collected by the sensor from manual input, received at the sensor, to modify light output of the one or more light fixtures. Thus, instead of a manual dimmer switch that directly dims or powers off a light fixture, the switch records such manual input (for example, to dim lights within a room) then waits to receive a polling request before transmitting this manual input. In response to receiving this manual input from the sensor, the lighting controller can then transmit a signal via the power line or other means based on manually input light modification data. The signal can include instructions that cause the one or more light fixtures to modify light output.

Figure 13:
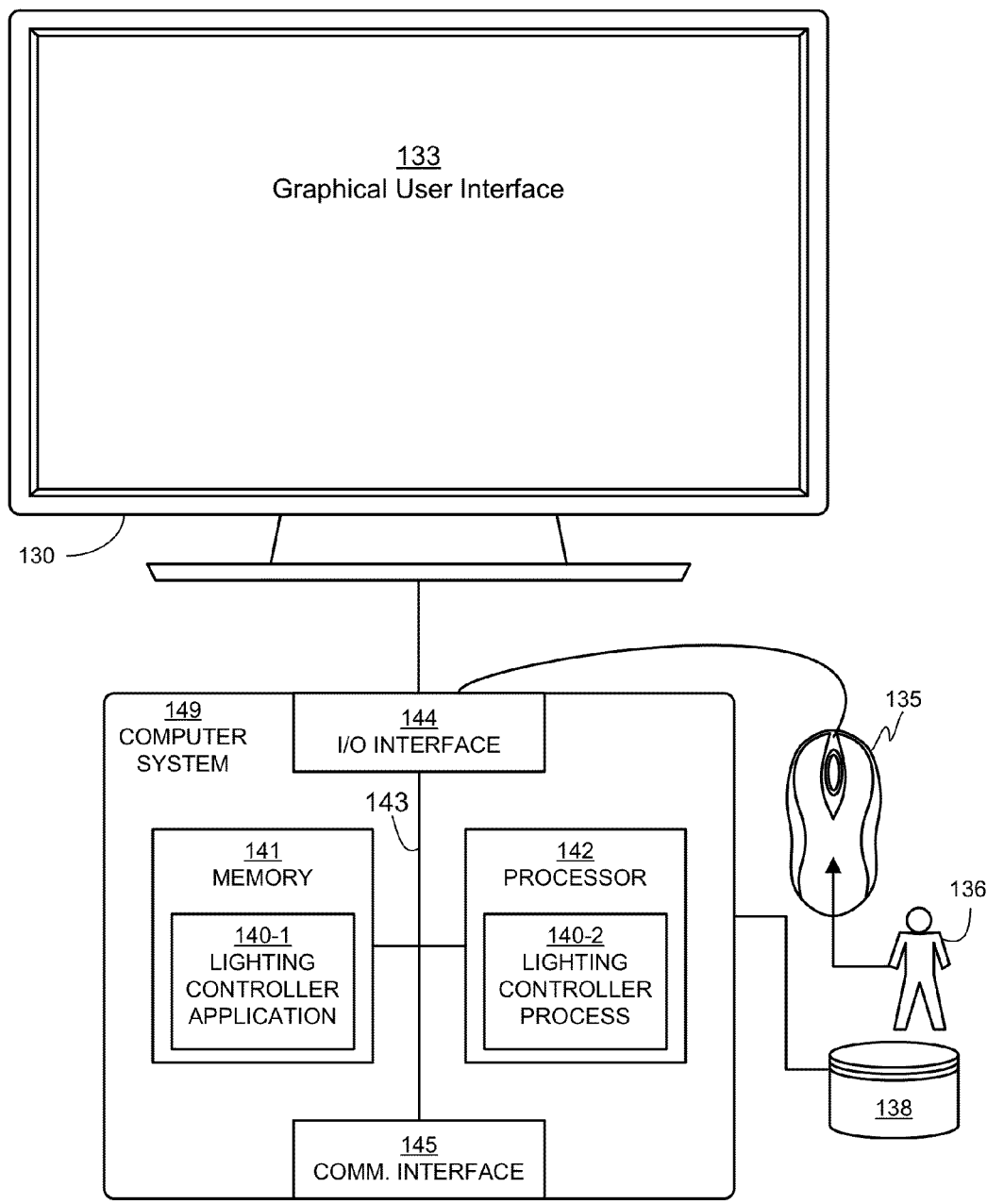
FIG. 13 is an example block diagram of a lighting system controller operating in a computer/network environment according to embodiments herein.

Now referring to FIG. 13, the following discussion provides a basic embodiment indicating how to carry out functionality associated with the lighting controller 140 as discussed above. It should be noted, however, that the actual configuration for carrying out the lighting controller 140 can vary depending on a respective application. For example, computer system 149 can include one or multiple computers that carry out the processing as described herein.

In different embodiments, computer system 149 may be any of various types of devices, including, but not limited to, a personal computer system, desktop computer, laptop, notebook, or netbook computer, mainframe computer system, handheld computer, workstation, network computer, application server, storage device, cell phone, a consumer electronics device such as a camera, camcorder, set top box, mobile device, video game console, handheld video game device, or in general any type of computing or electronic device.

Computer system 149 is shown connected to display monitor 130 for displaying a graphical user interface 133 for a user 136 to operate using input devices 135. Repository 138 can optionally be used for storing data files and content both before and after processing. Input devices 135 can include one or more devices such as a keyboard, computer mouse, etc.

As shown, computer system 149 of the present example includes an interconnect 143 that couples a memory system 141, a processor 142, I/O interface 144, and a communications interface 145.

I/O interface 144 provides connectivity to peripheral devices such as input devices 135 including a computer mouse, a keyboard, a selection tool to move a cursor, display screen, etc.

Communications interface 145 enables the lighting controller 140 of computer system 149 to communicate over a network and, if necessary, retrieve any data required to create views, process content, communicate with a user, etc. according to embodiments herein.

As shown, memory system 141 is encoded with lighting controller 140-1 that supports functionality as discussed above and as discussed further below. Lighting controller 140-1 (and/or other resources as described herein) can be embodied as software code such as data and/or logic instructions that supports processing functionality according to different embodiments described herein.

During operation of one embodiment, processor 142 accesses memory system 141 via the use of interconnect 143 in order to launch, run, execute, interpret or otherwise perform the logic instructions of the lighting controller 140-1. Execution of the lighting controller 140-1 produces processing functionality in lighting controller process 140-2. In other words, the lighting controller process 140-2 represents one or more portions of the lighting controller 140 performing within or upon the processor 142 in the computer system 149.

It should be noted that, in addition to the lighting controller process 140-2 that carries out method operations as discussed herein, other embodiments herein include the lighting controller 140-1 itself (i.e., the un-executed or non-performing logic instructions and/or data). The lighting controller 140-1 may be stored on a non-transitory, tangible computer-readable storage medium including computer readable storage media such as floppy disk, hard disk, optical medium, etc. According to other embodiments, the lighting controller 140-1 can also be stored in a memory type system such as in firmware, read only memory (ROM), or, as in this example, as executable code within the memory system 141.

In addition to these embodiments, it should also be noted that other embodiments herein include the execution of the lighting controller 140-1 in processor 142 as the lighting process 140-2. Thus, those skilled in the art will understand that the computer system 149 can include other processes and/or software and hardware components, such as an operating system that controls allocation and use of hardware resources, or multiple processors.

Those skilled in the art will also understand that there can be many variations made to the operations of the techniques explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A device for controlling lighting systems, the device comprising:
a processor;
a memory coupled to the processor;
an interface that connects to a power line for transmitting signals over the power line to control one or more light fixtures
a network interface for sending and receiving data over a communication network; and
the memory storing instructions that, when executed by the processor, cause the device to perform the operations of:
periodically polling a remote server to obtain demand response information, the remote server being polled over a communication network;
receiving the demand response information from the remote server;
determining, based on the demand response information, to modify light output of the one or more light fixtures; and
transmitting a signal via the power line, the signal including instructions that cause the one or more light fixtures to modify light output.

2. The device of claim 1, wherein the memory stores further instructions that, when executed by the processor, cause the device to perform the operations of:
polling a sensor to obtain light detection data collected by the sensor from visible light conditions of a physical space corresponding to the one or more light fixtures;
receiving the light detection data from the sensor;
determining, based on the light detection data, to modify light output of the one or more light fixtures; and
transmitting a signal via the power line based on the light detection data, the signal including instructions that cause the one or more light fixtures to modify light output.

3. The device of claim 2, wherein determining, based on the light detection data, to modify light output of the one or more light fixtures, includes determining to decrease light output of the one or more light fixtures in response to the light detection data indicating a light level above a predetermined amount.

4. The device of claim 1, wherein the memory stores further instructions that, when executed by the processor, cause the device to perform the operations of:
polling a sensor to obtain motion detection data collected by the sensor from a physical space corresponding to the one or more light fixtures;
receiving the motion detection data from the sensor;
determining, based on the motion detection data, to modify light output of the one or more light fixtures; and
transmitting a signal via the power line based on the motion detection data, the signal including instructions that cause the one or more light fixtures to modify light output.

5. The device of claim 4, wherein determining, based on the motion detection data, to modify light output of the one or more light fixtures, includes determining to decrease light output of the one or more light fixtures in response to the motion detection data indicating absence of motion for a predetermined amount of time.

6. The device of claim 5, wherein the memory stores further instructions that, when executed by the processor, cause the device to perform the operations of:
identifying a schedule for light fixture usage; and
transmitting a signal via the power line based on the schedule for light fixture usage, the signal including instructions that cause the one or more light fixtures to modify light output.

7. The device of claim 4, wherein the memory stores further instructions that, when executed by the processor, cause the device to perform the operations of:

polling a sensor to obtain light detection data collected by the sensor from visible light conditions of a physical space corresponding to the one or more light fixtures;

receiving the light detection data from the sensor;

determining, based on the light detection data, to modify light output of the one or more light fixtures; and transmitting a signal via the power line based on the light detection data, the signal including instructions that cause the one or more light fixtures to modify light output.

8. The device of claim 1, wherein transmitting the signal via the power line, the signal including instructions that cause the one or more light fixtures to modify light output, includes transmitting the signal to a light fixture control node device that is installed inline with the power line, the light fixture control node device being configured to receive light output instructions, and modify light output of the one or more fixtures by sending a signal over the power line to corresponding ballasts of the light fixtures.

9. The device of claim 8, wherein transmitting the signal to a light fixture control node device includes transmitting a different signal for subgroups of light fixtures connected to the light fixture control node device via the power line, each different signal causing each subgroup to modify light output to an output level independent from other subgroups.

10. The device of claim 1, wherein the memory stores further instructions that, when executed by the processor, cause the device to perform the operations of:

generating a graphical display that indicates power usage and power savings based on operation of the device and modified light output of the one or more light fixtures.

11. The device of claim 1, wherein the memory stores further instructions that, when executed by the processor, cause the device to perform the operations of:

receiving a polling request for demand response status from an HVAC (Heating, Ventilating, and Air Conditioning) control device; and transmitting demand response status of the device for controlling lighting systems to the HVAC control device.

12. The device of claim 1, wherein the memory stores further instructions that, when executed by the processor, cause the device to perform the operations of:

receiving a polling request for demand response status from a peer device for controlling lighting systems; and transmitting demand response status of the device for controlling lighting systems to the peer device for controlling lighting systems.

13. The device of claim 1, wherein the memory stores further instructions that, when executed by the processor, cause the device to perform the operations of:

receiving a polling request for demand response status from multiple peer devices for controlling lighting systems, the multiple peer devices being daisy chained to the device for controlling lighting systems; and transmitting demand response status of the device for controlling lighting systems to the multiple peer devices for controlling lighting systems via a daisy chain connection.

14. The device of claim 1, wherein the memory stores further instructions that, when executed by the processor, cause the device to perform the operations of:

polling multiple sensors to obtain light detection data collected by the sensor from visible light conditions of a physical space corresponding to the one or more light fixtures, and to obtain motion detection data collected by the sensor from the physical space corresponding to the one or more light fixtures, the multiple sensors being connected to the device for controlling lighting systems via a daisy chain connection; and transmitting a signal via the power line based on data collected from the multiple sensors, the signal including instructions that cause the one or more light fixtures to modify light output.

15. The device of claim 1, wherein the memory stores further instructions that, when executed by the processor, cause the device to perform the operations of:

identifying a schedule for light fixture usage; and transmitting a signal via the power line based on the schedule for light fixture usage, the signal including instructions that cause the one or more light fixtures to modify light output.

16. The device of claim 1, wherein the memory stores further instructions that, when executed by the processor, cause the device to perform the operations of:

polling a sensor to obtain light output modification data collected by the sensor from manual input, received at the sensor, to modify light output of the one or more light fixtures;

receiving the light output modification data from the sensor;

transmitting a signal via the power line based on manually input light modification data, the signal including instructions that cause the one or more light fixtures to modify light output.

17. A device for controlling lighting systems, the device comprising:

a processor;

a memory coupled to the processor;

an interface that connects to a power line for transmitting signals over the power line to control one or more light fixtures; and the memory storing instructions that, when executed by the processor, cause the device to perform the operations of:

periodically polling a sensor to obtain light detection data collected by the sensor from visible light conditions of a physical space corresponding to the one or more light fixtures, and to obtain motion detection data collected by the sensor from the physical space corresponding to the one or more light fixtures;

receiving the light detection data from the sensor and receiving the motion detection data from the sensor;

determining, based on the light detection data and the motion detection data, to modify light output of the one or more light fixtures; and transmitting a signal via the power line based on the light detection data and the motion detection data, the signal including instructions that cause the one or more light fixtures to modify light output.

18. The device of claim 17, wherein the memory stores further instructions that, when executed by the processor, cause the device to perform the operation of:

periodically polling multiple sensors to obtain light detection data collected by the multiple sensors from visible light conditions of a physical space corresponding to the one or more light fixtures, and to obtain motion detection data collected by the multiple sensors from the physical space corresponding to the one or more light fixtures, the multiple sensors being connected to the device for controlling lighting systems via a daisy chain connection.

19. The device of claim 18, wherein transmitting the signal via the power line, the signal including instructions that cause the one or more light fixtures to modify light output, includes transmitting the signal to a light fixture control node device that is installed inline with the power line, the light fixture control node device being configured to receive light output instructions, and modify light output of the one or more fixtures by sending a signal over the power line to corresponding ballasts of the light fixtures.

20. A computer-implemented method for controlling lighting systems, the computer-implemented method comprising:
- periodically polling a remote server to obtain demand response information that corresponds to electricity supply conditions, the remote server being polled over a communication network;
- receiving the demand response information from the remote server at a device that controls a lighting system, the device including an interface that connects to a power line for transmitting signals over the power line to control one or more light fixtures;
- determining, based on the demand response information, to modify light output of the one or more light fixtures; and
- transmitting a signal via the power line, the signal including instructions that cause the one or more light fixtures to modify light output.

* * * * *